US012762101B2

(12) United States Patent
Olsen et al.

(10) Patent No.: US 12,762,101 B2
(45) Date of Patent: Oct. 13, 2026

(54) ENTITY CLASSIFICATION USING CLEANSED TRANSACTIONS

(71) Applicant: Capital One Services, LLC, McLean, VA (US)

(72) Inventors: Sarah Olsen, Allen, TX (US); Aditya Pai, San Francisco, CA (US); Brice Elder, Mishawaka, IN (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 19/218,918

(22) Filed: May 27, 2025

(65) Prior Publication Data

US 2025/0284673 A1 Sep. 11, 2025

Related U.S. Application Data

(63) Continuation of application No. 18/115,446, filed on Feb. 28, 2023, now Pat. No. 12,332,855, which is a continuation of application No. 17/224,467, filed on Apr. 7, 2021, now Pat. No. 11,620,267.

(51) Int. Cl.
*G06F 16/00* (2019.01)
*G06F 16/215* (2019.01)
*G06F 16/23* (2019.01)
*G06F 16/25* (2019.01)
*G06F 16/28* (2019.01)

(52) U.S. Cl.
CPC ........ *G06F 16/215* (2019.01); *G06F 16/2358* (2019.01); *G06F 16/258* (2019.01); *G06F 16/285* (2019.01)

(58) Field of Classification Search
None
See application file for complete search history.

(56) References Cited

U.S. PATENT DOCUMENTS

2015/0332414 A1* 11/2015 Unser .................. G06F 16/285 705/30
2020/0387887 A1* 12/2020 Rathod .............. G06Q 20/3224
2021/0217014 A1* 7/2021 Shetty ................ G06Q 20/4014

* cited by examiner

*Primary Examiner* — Bai D Vu
(74) *Attorney, Agent, or Firm* — Banner & Witcoff, Ltd.

(57) ABSTRACT

Systems as described herein may classify entities based on cleansed transactions. An entity classification server may obtain transaction data indicating an entity name and an entity code in a non-standardized format. A recommended entity code in a standardized format may be determined from a remote data store. The entity classification server may generate a score indicating a likelihood that the recommended entity code correctly identifies the entity indicated in the transaction data using a machine classifier. The entity classification server may update the entity code in the transaction data with the recommended entity code based on the score exceeding a threshold value. Accordingly, a transaction summary comprising the transaction data may be generated and provided to a computing device.

20 Claims, 5 Drawing Sheets

ENTITY CLASSIFICATION USING CLEANSED TRANSACTIONS

CROSS-REFERENCE TO RELATED APPLICATIONS

The instant application is a continuation of co-pending U.S. patent application Ser. No. 18/115,446, titled "Entity Classification Using Cleansed Transactions," filed Feb. 28, 2023, which is a continuation of U.S. patent application Ser. No. 17/224,467, titled "Entity Classification Using Cleansed Transactions" filed Apr. 7, 2021, which issued as U.S. Pat. No. 11,620,267 on Apr. 4, 2023, the disclosure of which is hereby incorporated by reference in its entirety.

FIELD OF USE

Aspects of the disclosure relate generally to data processing and more specifically to the processing and management of big data.

BACKGROUND

In an electronic payment processing network, a financial institution may receive transaction data originated from a variety of merchant devices, including point of sale (POS) devices. However, some merchants may inadvertently provide incorrect classification codes or the POS devices may become outdated over time. As a result, conventional financial systems may fail to provide accurate transaction data.

Aspects described herein may address these and other problems, and generally improve the quality, efficiency, and speed of processing data to offer insights into transaction data so that users may make informed decisions.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems as described herein may include features for classifying merchant category information using cleansed transactions. An entity classification system may obtain transaction data associated with an entity (e.g. a merchant). The transaction data may indicate an entity code (e.g. a merchant category code) and an entity name. The entity code may be in a non-standardized format, such as a non-structured format or text format. The non-standardized format may not conform to, for example, International Standardization Organization (ISO): 18245 standard. The entity classification system may determine a recommended entity and an entity location from a remote data store and based on the entity name. The recommended entity code may be in a standardized format, such as an XML or JSON format. The standardized format may conform to, for example, the ISO: 18245 standard. The entity classification system may determine that the recommended entity code differs from the entity code. Using a machine classifier and based on the entity location, the entity classification system may subsequently generate a score indicating a likelihood that the recommended entity code correctly identifies the entity indicated in the transaction data. Based on the score exceeding a threshold value, the entity classification system may update the entity code with the recommended entity code. The updated entity code may in the standardized format. The transaction data may be stored with the updated entity code in a database. The entity classification system may generate a transaction summary including the transaction data and an indication that the transaction data has been updated. Transaction summary data may be provided to a computing device (e.g. a user device) for further processing and/or review.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
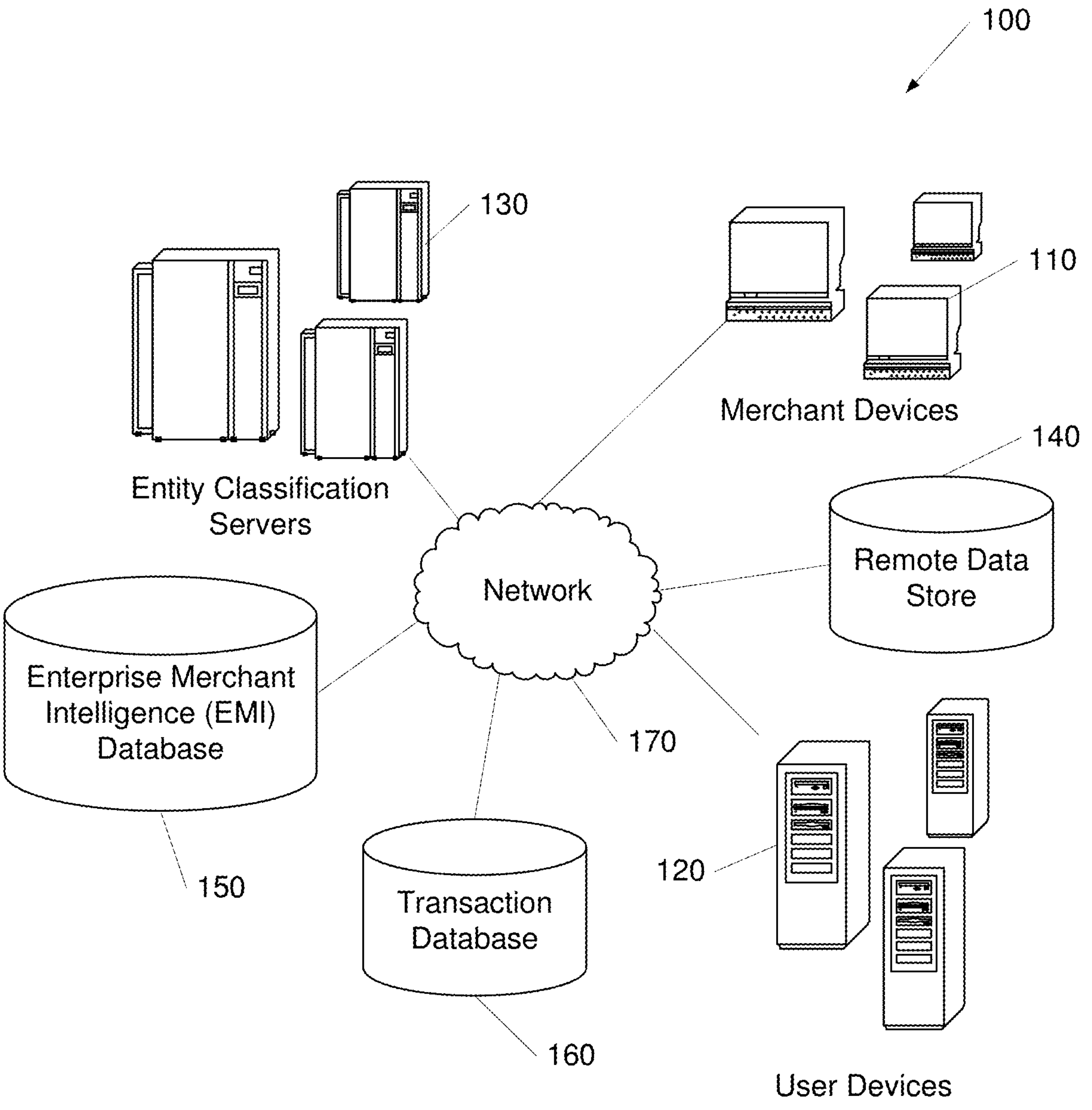
FIG. 1 shows an example of a system for classifying entities based on cleansed transactions in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for classifying entities based on cleansed transactions. In an electronic payment processing network, a financial institution may receive transaction data originated from a variety of merchant devices, including point of sale (POS) devices. The transaction data may include a merchant category code (MCC) which may be used to classify a business by the types of products or services it may provide. To facilitate their customers to understand the nature of the transactions, the financial institutions may aggregate transaction data based on various MCCs, and present transaction summaries to the customers. The financial institutions may also generate payment card rewards based on the MCCs. However, some merchants may inadvertently provide incorrect MCCs or the POS devices supplying the MCCs may become outdated over time. As a result, conventional financial systems may fail to review the accuracy of the merchant category information, and thereby limiting their ability to provide their customers with insights to the transactions and develop effective reward systems.

A remote data store may store a recommended entity code and may include a third-party service. The entity classification system may determine the recommended entity code by querying the third-party service to obtain a merchant category code corresponding to the entity name. The remote data store may include an entity database. The entity classification system may determine the recommended entity code by querying the entity database to obtain a ground truth merchant category code corresponding to the entity name. The remote data store may include a third-party location service. The entity classification system may determine the entity location by querying the third-party location service to obtain the entity location using the entity name.

In many aspects, the transaction data may be obtained from a POS device associated with the entity and may include an indication of one or more products associated with the transaction. The entity classification system may determine the recommended entity code based on the entity code in the transaction data and the one or more products associated with the transaction.

In many aspects, the machine classifier may be trained based on a set of ground truth entity locations, entity names and recommended entity codes. The score may be generated based on a similarity of the entity name to at least one of the entity name in the set of ground truth entity names used to train the machine classifier.

The entity classification system as described herein allows for determining a transaction category for the transaction based on the updated entity code and classifying the transaction data in the transaction summary based on the transaction summary. The entity classification system may obtain a corrected entity for the transaction and retrain the machine classifier based on the entity name and the corrected entity code.

Entity Classification Systems

FIG. 1 shows an example of a system 100 where the entity may be classified based on cleansed transactions. The system 100 may include one or more merchant devices 110, one or more user devices 120, at least one entity classification server 130, at least one remote data store 140, at least one enterprise merchant intelligence (EMI) database 150, and/or at least one transaction database 160 in communication via a network 170. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing devices described with respect to FIG. 2.

Merchant devices 110 may submit transaction information related to a transaction such as a transaction identifier, a transaction amount, an entity identifier or name (e.g. merchant name), an entity code (e.g. merchant category code (MCC)), a transaction location, and/or a transaction timestamp. In some examples, merchant devices 120 may also send an indication of one or more products associated with a transaction. The entity code, such as an MCC, may be in a first data format, such as a text format, non-structured format or a non-standardized format. For example, an MCC may be a four-digit number used by credit card companies to classify businesses into market segments. The MCC may indicate the types of services or goods being sold to customers. The financial intuitions may use these MCCs to classify transactions. Different merchants may use different merchant classifications for the similar products or services. For example, a first merchant may use a first MCC to define a catering service it provides to the customers while a second merchant may use a second, different MCC to define its catering service. One or both of the first MCC and second MCC transmitted in the raw transaction data may be in a non-standardized format. That is, both the first MCC and the second MCC utilize different codes to identify the same class of service provided by a merchant, creating ambiguity and complicating classification of the transaction. Further, it is possible that one or both of the MCCs used do not conform to a standard classification code for the class of service as described herein.

Some merchant devices 110 may be a Point of Sale (POS) device located at a merchant. The merchant may be a small business merchant, such as a convenience store, a coffee shop, a gas station, a farmer's market, etc. These merchants may assign the entity codes such as MCCs to represent the types of the services or goods provided by the merchants on a per POS basis. The MCCs may become outdated over time. In some examples, a merchant may program the POS device incorrectly, and inadvertently submit the wrong MCC. In some examples, a merchant may purchase or inherit a POS device from another business, and may subsequently fail to update the MCC to match the MCC of the new business. In a variety of embodiments, MCCs may be used to generate a reward system, such as credit card rewards. An incorrect classification of MCCs may result in the customers to receive incorrect rewards. In a variety of embodiments, MCCs may be used to indicate categories of previous purchases on the transaction summaries to be displayed to a customer. An incorrect MCC may cause the financial institution to display an inaccurate transaction summary. In a variety of embodiments, MCCs may be used to determine fees to be charged to a merchant on a per transaction basis. Likewise, the incorrect MCC may cause the incorrect fees to be charged to the merchant.

User devices 120 may be any device that belongs to a customer of a financial institution. The customers may conduct transactions with merchant devices 110 using user devices 120. For example, a customer may bring the user devices 120 to the vicinity of a POS device and submit payment information to the POS device. The customer may make an online payment using user devices 120 that submit the payment information to merchant devices 110. User devices 120 may receive a transaction summary indicating categories of previously conducted purchases. User devices 120 may receive information on reward program that the customers may be eligible to participate. User devices 120 may include computing devices, such as laptop computers, desktop computers, mobile devices, smart phones, tablets, and the like. According to some examples, user devices 120 may include hardware and software that allow them to connect directly to network 170. Alternatively, user devices 120 may connect to a local device, such as a personal computer, server, or other computing device, which connects to network 170.

Entity classification server 130 may receive transaction information containing raw transaction data from merchant devices 110 from a plurality of merchants. Entity classification server 130 may attempt to clean the raw transaction data. The raw transaction data may be in the form of a line of data that offers limited information about the transaction, with each piece of information appearing in certain locations within the line of data. For example, an entity identifier may appear in a specific location and may include 8-10 characters in the abbreviated form. The entity identifier may not be readily recognizable as a meaningful merchant name, particularly for small business merchants. Entity classification server 130 may process this abbreviated merchant identifier and convert it into a meaningful merchant name in a human readable format.

Entity classification server 130 may retrieve a recommended entity code (e.g. MCC) and entity location (e.g. merchant location) from a remote data store based on the merchant name. The recommended entity code may be in a standardized format. For example, the recommended entity code may an MCC based on the ISO: 18245 standard. Although MCCs may vary by the financial institutions who issue the payment cards (e.g. credit cards), there may be some commonalities among these MCCs. ISO: 18245 is an International Standardization Organization (ISO) standard concerning the assignment of MCC in retail financial services. ISO 18245:2003 defines code values used to enable the classification of merchants into specific categories based on the type of business, trade or services supplied, such as: MCCs 0001-1499: Agricultural Services; MCCs 1500-2999: Contracted Services; MCCs 4000-4799: Transportation Services; MCCs 4800-4999: Utility Services; MCCs 5000-5599: Retail Outlet Services; MCCs 5600-5699: Clothing Stores; MCCs 5700-7299: Miscellaneous Stores; MCCs 7300-7999: Business Services; MCCs 8000-8999: Professional Services and Membership Organizations; and MCCs 9000-9999: Government Services.

Entity classification server 130 may use a machine classifier to generate a score indicating a likelihood that the recommended entity code correctly identifiers the entity in the transaction data. Entity classification server 130 may take in location attributions and merchant names, and may identify the closest match for a known merchant to the transaction. For example, the machine classifier may be trained using a set of ground truth entity locations, entity names and recommended entity codes. The score may be generated based on a similarity of the entity name to at least one of the entity names in the set of ground truth entity names. Entity classification server 130 may update the entity code in the transaction data with the recommended entity code, after determining that the score exceeding a threshold value. The updated entity code may be in a standardized format, such as an XML or JSON format. The updated entity code may also be an MCC based on ISO 18245:2003 standard.

Entity classification server 130 may generate a transaction summary including the transaction data and an indication that the transaction data has been updated. For example, the transaction summary may display categories of previously conducted purchases made by a customer. Entity classification server 130 may determine a transaction category for the transaction based on the updated entity code. Entity classification server 130 may classify the transaction data in the transaction summary based on the transaction category. The transaction summary may include one or more reward programs that the customer may be eligible to participate. Entity classification server 130 may improve the quality of the transaction summary based on the updated transaction data.

Remote data store 140 may store entity codes and entity locations, such as MCCs and merchant locations associated with the merchants. Remote data store 140 may include a third-party service that may provide the merchant information such as the recommended MCC, merchant names, and/or merchant locations. Entity classification server 130 may determine the recommended MCC by querying the third-party service to obtain an MCC corresponding to the entity name. Remote data store 140 may include an entity database, such as a merchant database. Entity classification server 130 may determine the recommended MCC by querying the entity database to obtain a ground truth MCC corresponding to the entity name. Remote data store 140 may include a third-party location service. Entity classification server 130 may determine the entity location by querying the third-party location service to obtain the entity location corresponding to the entity name.

Enterprise merchant intelligence (EMI) database 150 may store merchant records related to various merchants, including small business merchants. EMI database 150 may be a merchant database that stores enterprise merchant intelligence records, which may in turn include a merchant identifier, a friendly merchant name, a zip code, a physical address, a phone number, an email or other contact information of the merchants, and/or a corresponding MCC. As discussed above, entity classification server 130 may update an entity code in a transaction with a recommended MCC and the updated entity code may be in a standardized format. Entity classification server 130 may subsequently store the corresponding merchant information corresponding to the transaction data in EMI database 150.

In a variety of embodiments, entity classification server 130 may build a proprietary EMI database 150, for example, based on an aggregation of transaction records received in the transaction stream. As a transaction arrives from a transaction stream, the corresponding transaction record may be processed, cleaned, and/or enhanced with a variety of services. In a variety of embodiments, entity classification server 130 may use a third-party API to gather merchant information, such as an MCC, a merchant address or contact information, to be stored in EMI database 150. In a variety of embodiments, entity classification server 130 may maintain static merchant information, such as a merchant identifier and merchant name, in its proprietary EMI database 150 and entity classification server 130 may use the third-party API to get merchant address, merchant social media handle, MCCs, or other merchant information that may change over time.

Transaction database 160 may store transaction records related to transactions previously conducted by customers in transaction streams from a plurality of merchants. Transaction database 160 may receive a request from entity classification servers 130 and retrieve the corresponding transaction records in the transaction streams. The transaction records may each contain an account identifier, a transaction amount, a transaction time, a merchant identifier, MCC, etc., where the MCC may be in a non-standardized format. After the MCC is updated with the updated entity code in a standardized format, the corresponding transaction record may be stored in transaction database 160 with an indication that the transaction data has been updated.

Merchant devices 110, user devices 120, entity classification server 130, remote data store 140, EMI database 150, and/or transaction database 160 may be associated with a particular authentication session. Entity classification server 130 may receive, process, and/or store a variety of transaction records, merchant intelligence information and location information, and/or receive transaction records with merchant devices 110 as described herein. However, it should be noted that any device in system 100 may perform any of the processes and/or store any data as described herein. Some or all of the data described herein may be stored using one or more databases. Databases may include, but are not limited to relational databases, hierarchical databases, distributed databases, in-memory databases, flat file databases, XML databases, NoSQL databases, graph databases, and/or a combination thereof. The network 170 may include a local area network (LAN), a wide area network (WAN), a wireless telecommunications network, and/or any other communication network or combination thereof.

The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the data sharing system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

Computing Devices

Figure 2:
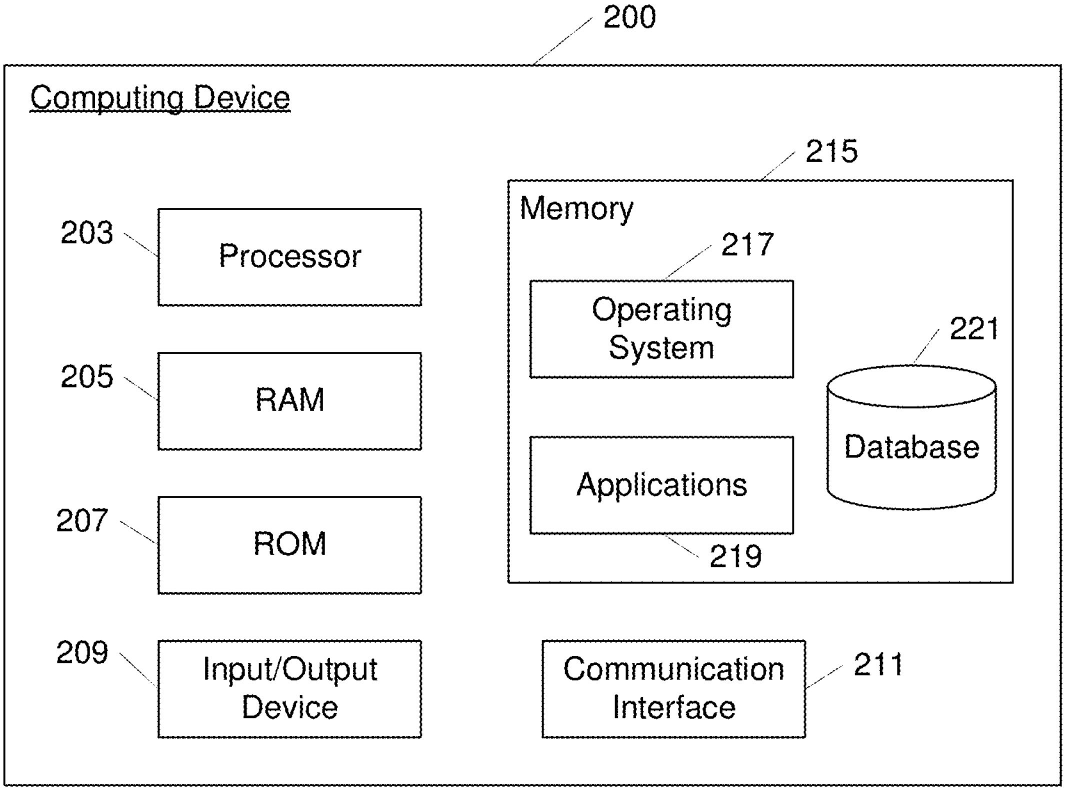
FIG. 2 shows an example computing device in accordance with one or more aspects described herein.

Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Classifying Entities Based on Cleansed Transactions

The entity classification system may use raw transaction data and raw merchant information, and resolve them to an internal merchant database, such as the EMI database. The entity classification system may also compare the raw merchant data to a third-party database and score each merchant record for a transaction using a machine classifier. The entity classification system may correct transactions associated with the internal merchant information or third-party merchant based on the machine classifier score. The machine classifier may be trained on location similarity, merchant name similarity, and/or transaction (e.g. shopping cart) similarity to probabilistically determine the appropriate merchant and particular MCC. As such, the entity classification system may use merchant information, such as location attributes and merchant names, to find the closest match for a known merchant associated with the transaction.

Figure 3:
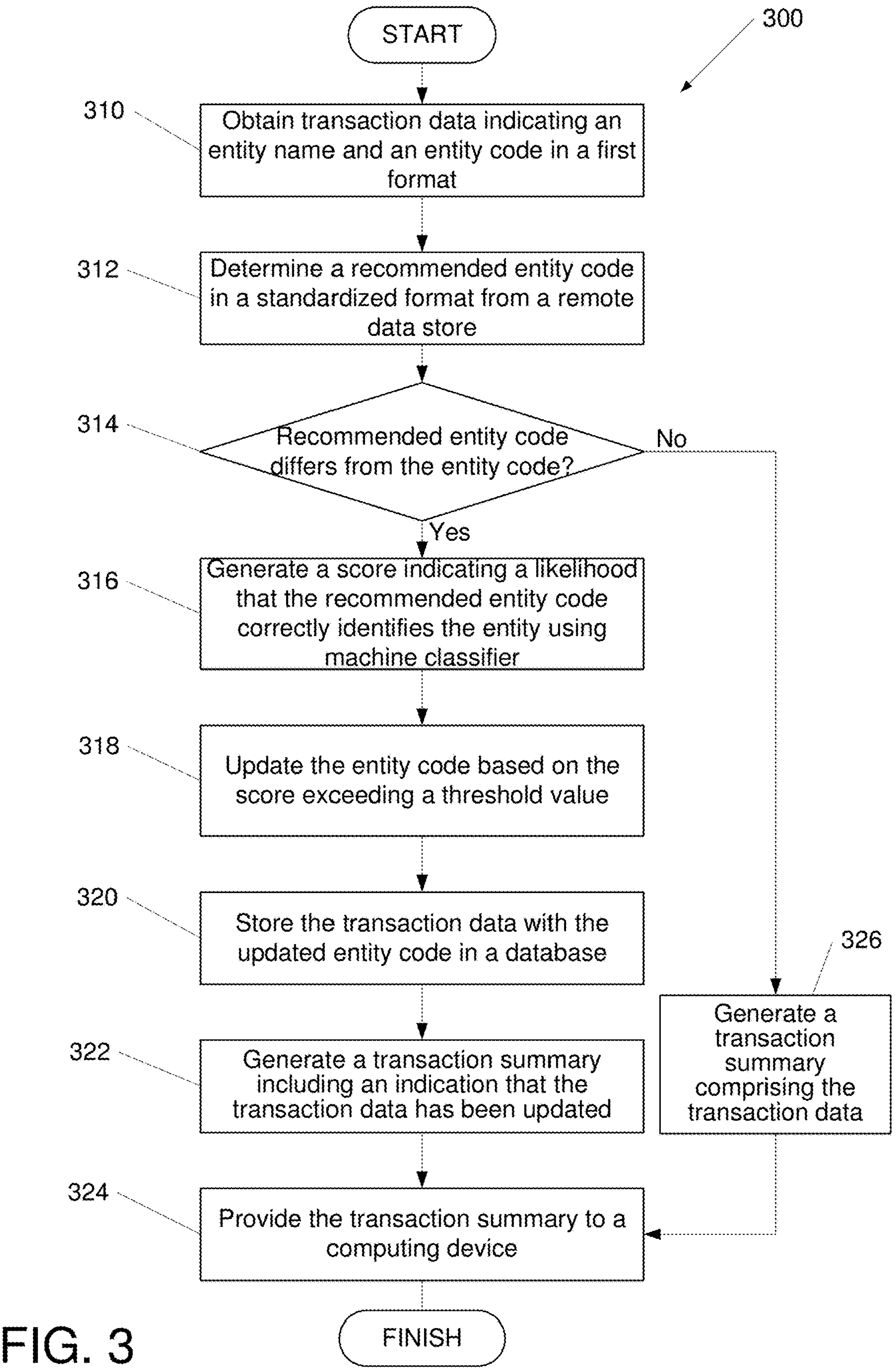
FIG. 3 shows a flow chart of a process for classifying entities based on cleansed transactions according to one or more aspects of the disclosure.

FIG. 3 shows a flow chart of a process for predicting impacts to a supply chain by analyzing current events according to one or more aspects of the disclosure. Some or all of the steps of process 300 may be performed using one or more computing devices as described herein. In a variety of embodiments, some or all of the steps described below may be combined and/or divided into sub-steps as appropriate.

At step 310, an entity classification server may obtain transaction data associated with an entity (e.g. merchant). The transaction data may indicate an entity code (e.g. MCC) and an entity name (e.g. merchant name). The transaction data may also include an indication of one or more products associated with the transaction. For example, the transaction may be associated with an online transaction and a merchant shopping cart application may send the transaction data including the indication of one or more products to the entity classification server. The raw transaction data may be in the form of a line of data that offers limited information about the transaction, with each piece of information appearing in certain locations within the line of data. The entity classification server may perform a cleansing process to extract the merchant information from specific location of the line of data. For example, the entity classification server may extract a merchant identifier, which may include 8-10 characters in the abbreviated form. The entity classification server may process this abbreviated merchant identifier and convert it into a meaningful merchant name. The entity classification server may query the EMI database to obtain the relevant merchant information. The entity classification server may also extract the MCC from the line of data. The MCC extracted from the raw transaction data may be in a text format, a non-structured format, or a non-standardized format. In a variety of embodiments, MCCs may be assigned by a payment network when the merchants set up a credit card payment system. Card-issuing financial intuitions may not have control over how MCCs are assigned by the merchants and may not have the ability to change them after the assignment. MCCs may be used in the rewards system by the financial institutions. For example, a purchase of candy in a candy store may be coded differently than a purchase of candy at a supermarket, which may have different MCCs. When a customer uses a payment card to buy a Milky Way at a local grocery store, she may not earn bonus rewards that the customer may normally get at a candy store.

In a variety of embodiments, MCCs may be associated with an industry segment, such as catering, or personal services. MCCs may be associated with a specific type of goods or service that the merchants provide in the industry segment. For example, the building/electrical/plumbing/heating industry segment may include general contractors, electrical contractors, masonry/tile/plaster installers, and/or carpentry etc.

In a variety of embodiments, MCCs in the transaction data may be in a non-standardized format. MCCs may vary by the merchants, where different merchants providing the similar type of products or services may use different MCCs. For example, merchant 1 and merchant 2 may both provide similar type of services (e.g. building/electrical/plumbing/heating). Merchant 1 may use MCC code 1 while merchant 2 may use MCC code 2 to represent similar type of services in the transaction data. MCCs may vary by the financial institutions who issue the payment cards. For example, merchant 3 who is an electrical contractor may use MCC code 3 for American Express related transactions. Merchant 3 may use MCC code 4 for Master Card related transactions. Some financial institutions may not assign MCCs to the merchants. For example, if a customer uses a Discover Card to make purchases at a merchant that may otherwise fit in a rewards category, the merchant may not have an assigned MCC in that rewards category. MCCs may be assigned to the merchants with incorrect MCCs, and the financial institutions may not have the ability to change the MCCs after the assignment. For example, the merchants may program a payment terminal with an incorrect MCC. MCCs may also become outdated over time. For example, a merchant may acquire a payment terminal from another business and may fail to update the MCC to match the category of the current business.

At step 312, the entity classification server may determine a recommended entity code (e.g. MCC) and an entity location (e.g. merchant address). The entity classification may query a remote data store and retrieve the merchant information based on the merchant name. The recommended entity code, such as an MCC, may be in a standardized format. For example, the remote data store may return an MCC for the named merchant and the MCC may be defined according to ISO 18245:2003 standard. The remote data store may include a third-party service that may provide the recommended MCC in the standardized format and the merchant location based on the merchant name. The remote data store may include an entity database such as a merchant database or the EMI database. The entity classification server may query the entity database to obtain a ground truth MCC in the standardized format corresponding to the entity name. The remote data store may include a third-party location service that may provide the merchant location based on the merchant name.

At step 314, the entity classification server may determine whether the recommended entity code differs from the entity code in extracted from the raw transaction data. If the recommended entity code is not different from the entity code in the transaction data (step 314=No), the process may proceed to step 326, where the entity classification server may generate a transaction summary including the transaction data. The transaction summary may indicate categories of previously conducted purchases made by a customer. The transaction data may be classified based on the entity code and the transaction summary may be provided to the user device. The transaction summary may include one or more reward programs that the customer may be eligible to participate. If the recommended entity code is different from the entity code in the transaction data (step 314=Yes), the process may proceed to step 316.

At step 316, the entity classification server may generate a score indicating a likelihood that the recommended entity code correctly identifies the entity in the transaction data. The entity classification server may use a machine classifier to generate the score based on the entity location. The machine classifier may be a supervised machine learning classifier and/or an unsupervised machine learning classifier. The machine classifier may use the merchant location, merchant names, the recommended MCC, and the like as inputs to the machine classifier. The machine classifier may use additional input, such as one or more products associated with the transaction. It should be readily apparent to one having ordinary skill in the art that a variety of machine classifier architectures can be utilized including (but not limited to) decision trees, k-nearest neighbors, support vector machines (SVM), neural networks (NN), recurrent neural networks (RNN), convolutional neural networks (CNN), probabilistic neural networks (PNN), transformer models, and the like. RNNs can further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In a number of embodiments, a combination of machine classifiers can be utilized, more specific machine classifiers when available, and general machine classifiers at other times can further increase the accuracy of predictions.

Merchant records in the EMI database and/or transaction records in the transaction database may be used as training data that is fed into the machine classifier. The training data may include a set of ground truth entity locations (e.g. merchant locations), entity names (e.g. merchant names), and/or recommended entity codes (e.g. MCCs). The machine classifier may also determine a score (e.g. a confidence score) to indicate the degree at which the recommended entity code correctly identifies the entity in the transaction data. The machine classifier may be tuned based on the confidence score exceeding a threshold value. The machine classifier may be trained based on a set of ground truth entity locations, entity names, and recommended entity codes. The confidence score may be generated based on a similarity of the entity name to at least one of the entity name in the set of ground truth entity names used to train the machine classifier. The machine classifier be a supervised machine learning classifier and may receive a corrected entity code for the transaction. The machine classifier may be retrained based on the entity name and the corrected entity code. As such, the machine classifier may be trained on merchant location similarity, merchant name similarity and/or transaction similarity to probabilistically determine the appropriate merchant in the transaction data and particular MCC for the merchant.

At step 318, upon a determination that the score (e.g. the confidence score) exceeds a threshold value, the entity classification server may update the entity code in the transaction data with the recommended entity code. For example, the MCC in the transaction data may be updated with the recommended MCC when the confidence score, for example, reaches a 90% threshold. However, any threshold score can be used as appropriate. The recommended entity code (e.g. MCC) may be in a standardized format. It is possible that the machine classifier may determine multiple confidence scores associated with multiple MCCs. The entity classification server may select an MCC as the recommended MCC based on the comparison of the confidence scores as described in more detail with respect to FIG. 4.

At step 320, the entity classification server may store the transaction data with the updated entity code in a database. For example, the transaction data may be updated and stored in a transaction database. The merchant information with the updated entity code (e.g. MCC) may also be store in the EMI database.

At step 322, the entity classification server may generate a transaction summary including the transaction data and an indication that the transaction data has been updated. At step 324, the transaction summary may be provided to a computing device, such as a user device of a customer. The entity classification server may send a notification to the user device indicating that the transaction data has been updated and present the transaction summary to the user device. The transaction summary may display categories of previously conducted purchases made by a customer. The transaction data may be classified based on the updated entity code, such as the MCC in the standardized format. The transaction summary may include one or more reward programs that the customer may be eligible to participate or the rewards that the customer has earned on her accounts.

Figure 4:
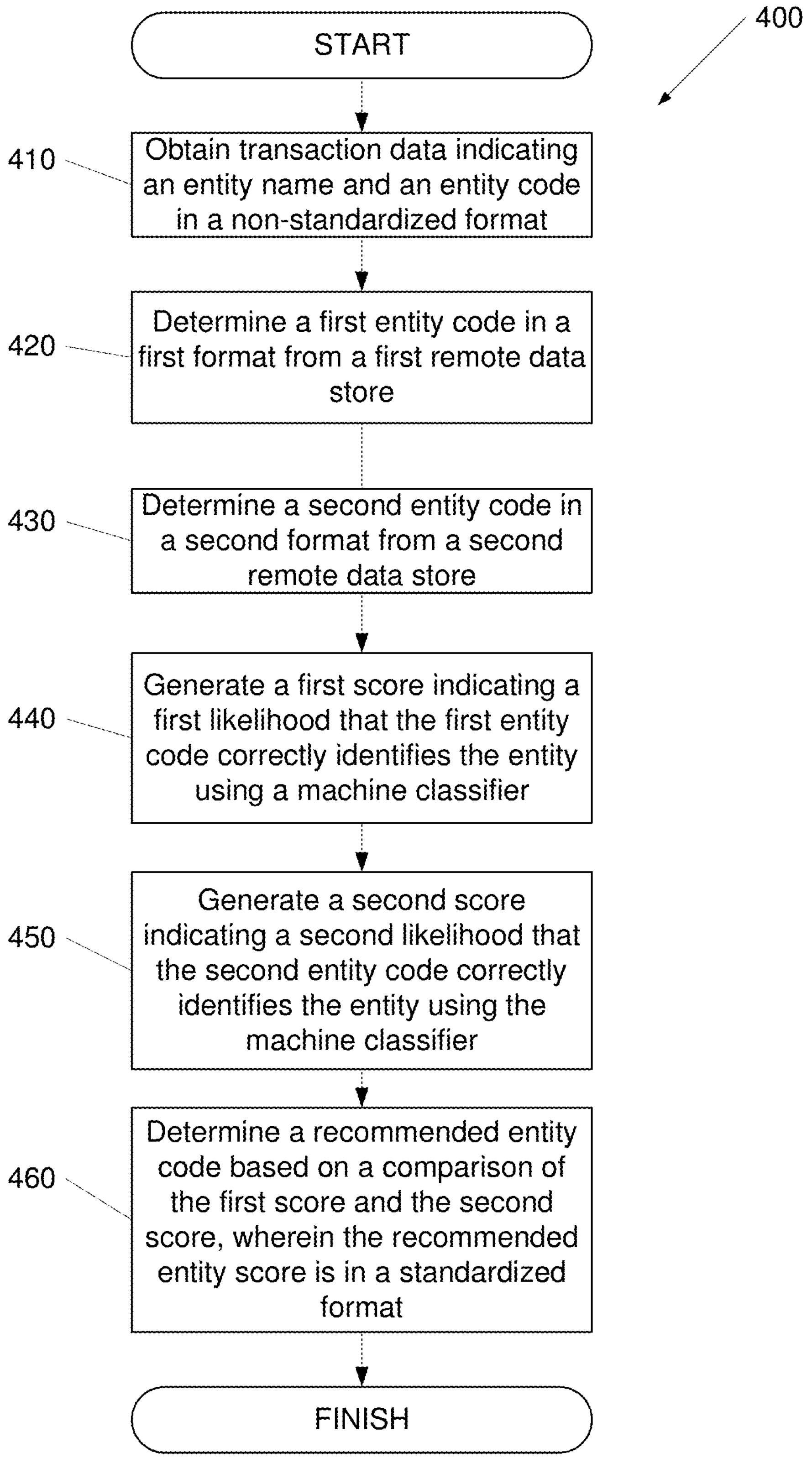
FIG. 4 shows a flow chart of a process for determining an entity code according to one or more aspects of the disclosure.

FIG. 4 shows a flow chart of a process for determining a recommended entity code according to one or more aspects of the disclosure. Some or all of the steps of process 400 may be performed using one or more computing devices as described herein. In a variety of embodiments, some or all of the steps described below may be combined and/or divided into sub-steps as appropriate.

At step 410, the entity classification server may obtain transaction data indicating an entity name and an entity code in a non-standardized format. This step may be similar to step 310 in FIG. 3. The transaction data may be obtained from a transaction stream or from a transaction database. At step 420, the entity classification server may determine a first entity code in a first format from a first remote data store. The first remote data store may be the EMI database or a third-party data store. The first entity code may be determined based on a match of the entity name in the transaction data to a corresponding record in the first remote data store. At step 430, the entity classification server may determine a second entity code in a second format from a second remote data store. The second remote data store may be the EMI database or a third-party data store. The second entity code may be determined based on a match of the entity name in a transaction data to a corresponding record in the second remote data store. At step 440, the entity classification server may generate a first score indicating a first likelihood that the first entity code correctly identifies the entity using a machine classifier. For example, the first score may be a confidence score of 80%. At step 450, the entity classification server may generate a second score indicating a second likelihood that the second entity code correctly identifies the entity using the machine classifier. For example, the second score may be a confidence score of 90%. At step 460, the entity classification server may determine a recommended entity code based on a comparison of the first score and the second score. For example, the entity classification server may determine that the second entity code has a higher confidence score and may select the second entity code as the recommended entity score. The recommended entity score may be in a standardized format. For example, the recommended entity score may be based on ISO 18245:2003 standard.

Figure 5:
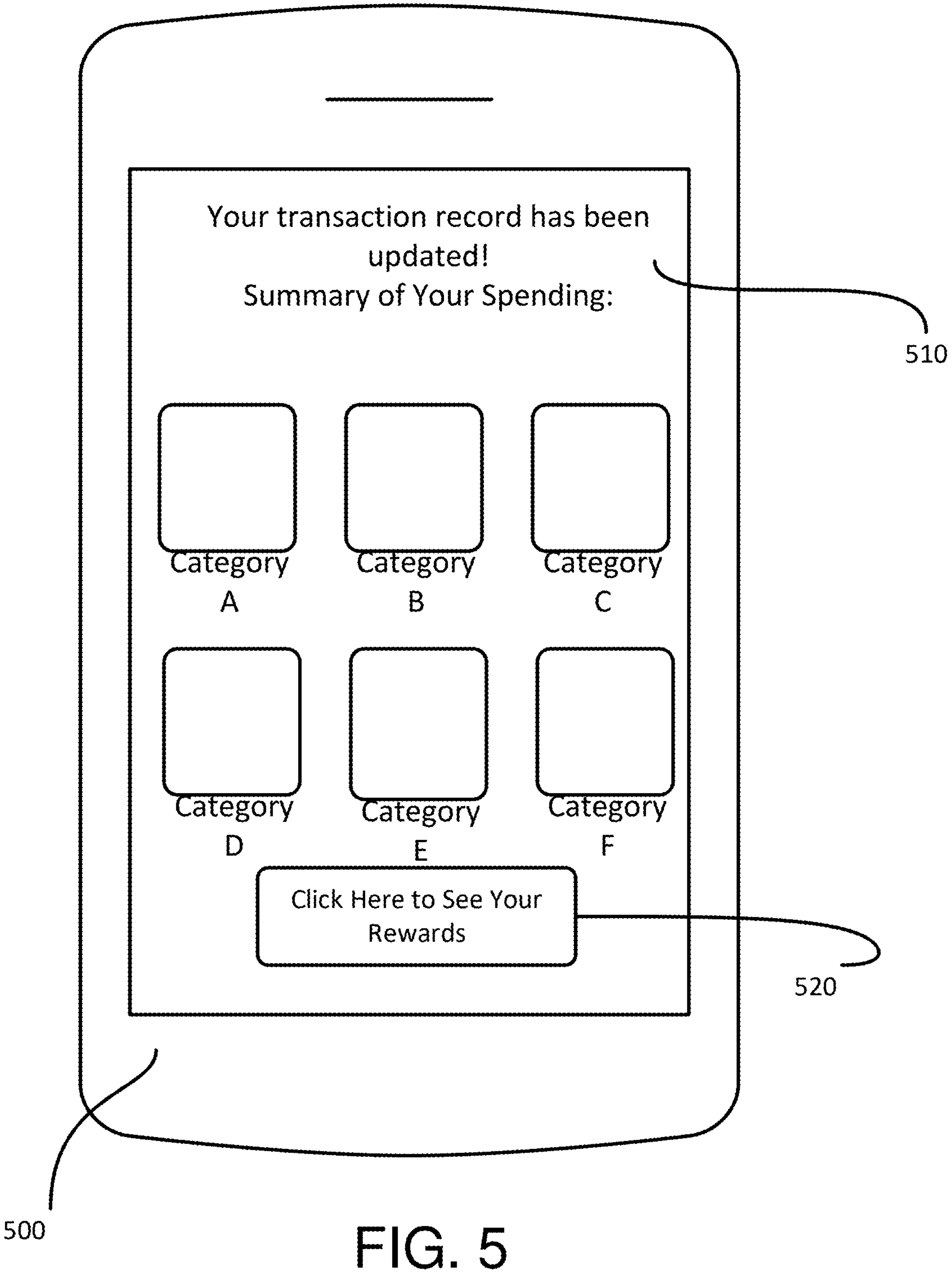
FIG. 5 shows an example user interface generated based on cleansed transactions according to one or more aspects of the disclosure.

FIG. 5 shows an example user interface generated based on cleansed transactions according to one or more aspects of the disclosure. In FIG. 5, a notification 510 may be sent to a user device 500 with an indication that the transaction record has been updated for the customer. User device 500 may display a plurality of categories of spending (e.g. Categories A-F) that the customer has made in a certain period of time (e.g. a month or week). For example, Category A may include expenditures related to catering services, Category B may include expenditures related to grocery stores, Category C may include expenditures related to child care services, etc. The customer may select a category of spending, such as Category A to see the detailed expenditures and the transaction summary may display a list of restaurants and the related expenditures. The display screen of user device 500 may provide an option 520 to display the rewards that the customer may have earned or the rewards programs that the customer may be eligible to participate in the future. It should be noted that any categories can be displayed in accordance with various aspects of the disclosure.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:

obtaining, by a computing device from a point of sale (POS) device and via a first application programming interface (API), transaction data for a transaction comprising an entity name associated with a merchant and an entity code associated with the POS device, wherein the entity code indicates a type of product or service provided by the merchant;

retrieving, via a second API different from the first API, a recommended entity code in a standardized format associated with the entity name;

providing, as input to a machine learning classifier, the recommended entity code and the entity name;

receiving, as output from the machine learning classifier, a score indicating a likelihood that the recommended entity code identifies the merchant associated with the transaction data;

updating, based on the score indicating the likelihood exceeding a threshold value, the transaction data with the recommended entity code;

storing, in a remote data store, the transaction data with the recommended entity code in a database;

generating, by the computing device, a transaction summary comprising a category of previously conducted transactions corresponding to the recommended entity code, wherein the category of previously conducted transactions comprising the transaction; and causing to display, by the computing device and on a user device, of the transaction summary.

2. The computer-implemented method of claim 1, wherein the second API comprises a third-party API.

3. The computer-implemented method of claim 1, wherein retrieving the recommended entity code comprises:

querying, based on a meaningful entity name and via the second API, an enterprise merchant intelligence (EMI) database, to retrieve the recommended entity code.

4. The computer-implemented method of claim 1, wherein obtaining the transaction data comprises:

receiving, via the first API and from the POS device, raw transaction data associated with the transaction in a non-structured format;

cleansing, based a predetermined location in the raw transaction data, the raw transaction data to extract a merchant identifier in an abbreviated form; and translating the merchant identifier in the abbreviated form to a meaningful entity name.

5. The computer-implemented method of claim 4, wherein cleansing the raw transaction data comprises:

converting the raw transaction data from the non-structured format to a structured representation of the transaction data.

6. The computer-implemented method of claim 4, wherein storing, in the remote data store, the transaction data with the recommended entity code comprises:

storing, in the remote data store, the cleansed transaction data with the meaningful entity name and the recommended entity code.

7. The computer-implemented method of claim 1, further comprising:

updating, by the computing device, and based on the score exceeding the threshold value, the entity code, indicated by the transaction data, with the recommended entity code.

8. The computer-implemented method of claim 1, further comprising:

determining an entity location by querying, using the entity name, a third-party location service; and providing, as input to the machine learning classifier, the entity location.

9. The computer-implemented method of claim 1, wherein the transaction data further comprises an indication of one or more products associated with a transaction, and the recommended entity code is further based on the entity code and the one or more products associated with the transaction.

10. The computer-implemented method of claim 1, further comprising:

determining a transaction category for the transaction data based on the recommended entity code; and classifying, based on the transaction category, the transaction data in the transaction summary, wherein providing the transaction summary to the user device comprises providing the transaction summary comprising the classified transaction data corresponding to the transaction category.

11. The computer-implemented method of claim 1, further comprising:

training, using training data, the machine learning classifier, wherein the training data comprises:

entity names associated with training merchants, and entity codes associated with the training merchants.

12. The computer-implemented method of claim 1, further comprising:

receiving, via a user interface on the user device, a corrected entity code for a transaction; and retraining the machine learning classifier based on the entity name and the corrected entity code.

13. An apparatus, comprising:

one or more processors; and memory storing instructions that, when executed by the one or more processors, cause the apparatus to:

obtain, from a point of sale (POS) device and via a first application programming interface (API), transaction data for a transaction comprising an entity name associated with a merchant and an entity code associated with the POS device, wherein the entity code indicates a type of product or service provided by the merchant;

retrieve, via a second API different from the first API, a recommended entity code in a standardized format associated with the entity name;

provide, as input to a machine learning classifier, the recommended entity code and the entity name;

receive, as output from the machine learning classifier, a score indicating a likelihood that the recommended entity code identifies the merchant associated with the transaction data;

update, based on the score indicating the likelihood exceeding a threshold value, the transaction data with the recommended entity code;

store, in a remote data store, the transaction data with the recommended entity code in a database;

generate a transaction summary comprising a category of previously conducted transactions corresponding to the recommended entity code, wherein the category of previously conducted transactions comprising the transaction; and cause to display, on a user device, of the transaction summary.

14. The apparatus of claim 13, wherein the second API comprises a third-party API.

15. The apparatus of claim 13, wherein the instructions, when executed by the one or more processors, cause the apparatus to retrieve the recommended entity code by:

querying, based on a meaningful entity name and via the second API, an enterprise merchant intelligence (EMI) database, to retrieve the recommended entity code.

16. The apparatus of claim 13, wherein the instructions, when executed by the one or more processors, cause the apparatus to obtain the transaction data by:

receiving, via the first API and from the POS device, raw transaction data associated with the transaction in a non-structured format;

cleansing, based a predetermined location in the raw transaction data, the raw transaction data to extract a merchant identifier in an abbreviated form; and translating the merchant identifier in the abbreviated form to a meaningful entity name.

17. The apparatus of claim 16, wherein the instructions, when executed by the one or more processors, cause the apparatus to cleanse the raw transaction data by:

converting the raw transaction data from the non-structured format to a structured representation of the transaction data.

18. The apparatus of claim 16, wherein the instructions, when executed by the one or more processors, cause the apparatus to:

store, in the remote data store, the cleansed transaction data with the meaningful entity name and the recommended entity code.

19. A non-transitory computer-readable medium storing instructions that, when executed by one or more processors, cause the one or more processors to perform steps comprising:

obtaining, from a point of sale (POS) device and via a first application programming interface (API), transaction data for a transaction comprising an entity name associated with a merchant and an entity code associated with the POS device, wherein the entity code indicates a type of product or service provided by the merchant;

retrieving, via a second API different from the first API, a recommended entity code in a standardized format associated with the entity name;

providing, as input to a machine learning classifier, the recommended entity code and the entity name;

receiving, as output from the machine learning classifier, a score indicating a likelihood that the recommended entity code identifies the merchant associated with the transaction data;

updating, based on the score indicating the likelihood exceeding a threshold value, the transaction data with the recommended entity code;

storing, in a remote data store, the transaction data with the recommended entity code in a database;

generating a transaction summary comprising a category of previously conducted transactions corresponding to the recommended entity code, wherein the category of previously conducted transactions comprising the transaction; and causing to display, on a user device, of the transaction summary.

20. The non-transitory computer-readable medium of claim 19, wherein the second API comprises a third-party API.

* * * * *